(12) United States Patent
Kaeb et al.

(10) Patent No.: US 10,081,505 B2
(45) Date of Patent: Sep. 25, 2018

(54) BIN WALL CLEANER GUIDE ATTACHMENT FOR SWEEP CONVEYOR

(71) Applicant: Illinois Grain & Seed, Inc., Cissna Park, IL (US)

(72) Inventors: Todd W. Kaeb, Cissna Park, IL (US); Andrew L. Stock, Cissna Park, IL (US); Nathan L. Kaeb, Loda, IL (US); James K. Enz, Claytonville, IL (US)

(73) Assignee: Illinois Grain & Seed, Inc., Cissna Park, IL (US)

( * ) Notice: Subject to any disclaimer, the term of this patent is extended or adjusted under 35 U.S.C. 154(b) by 0 days.

(21) Appl. No.: 15/448,188

(22) Filed: Mar. 2, 2017

(65) Prior Publication Data
US 2017/0253444 A1    Sep. 7, 2017

Related U.S. Application Data

(60) Provisional application No. 62/303,819, filed on Mar. 4, 2016.

(51) Int. Cl.
| | |
|---|---|
| *B65G 69/08* | (2006.01) |
| *B65G 65/46* | (2006.01) |
| *B65G 45/10* | (2006.01) |

(52) U.S. Cl.
CPC ............. *B65G 69/08* (2013.01); *B65G 45/10* (2013.01); *B65G 65/466* (2013.01)

(58) Field of Classification Search
CPC .... B65G 2814/0217; B65G 2814/0223; B65G 65/466; B65G 69/08; B65G 45/10
USPC ................................. 414/311, 314
See application file for complete search history.

(56) References Cited

U.S. PATENT DOCUMENTS

| | | | | |
|---|---|---|---|---|
| 2,876,043 | A | | 3/1959 | Dusen et al. |
| 3,013,674 | A | * | 12/1961 | Patz ..................... A01F 25/2009 414/313 |
| 3,138,268 | A | * | 6/1964 | Buschbom .......... A01F 25/2009 15/104.095 |
| 3,144,144 | A | | 8/1964 | Sime |
| 3,229,827 | A | * | 1/1966 | Kucera ............... A01F 25/2009 198/592 |
| 3,239,279 | A | | 3/1966 | Skromme et al. |
| 3,291,325 | A | * | 12/1966 | Henningsen ........ A01F 25/2009 414/318 |
| 3,363,785 | A | * | 1/1968 | Kucera ............... A01F 25/2009 198/517 |

(Continued)

OTHER PUBLICATIONS

Brock, Bin Sweeps.

*Primary Examiner* — Mark C Hageman
(74) *Attorney, Agent, or Firm* — Daniel J. Coughlin; Coughlin Law Office LLC

(57) ABSTRACT

A bin wall cleaner for a sweep conveyors and augers for removing residual grain located near the bin wall out of reach of the sweep conveyor and providing sweep coverage for non-uniform bin walls. The bin wall cleaner has a grain engagement member that extends outwardly from the distal end of the sweep. A biasing member maintains the grain engagement member extended toward the bin wall. A wall engagement member is attached to the grain engagement member to ensure the bin wall cleaner tracks with the bin wall. The grain engagement member extends by pivoting or telescoping at least one blade.

6 Claims, 4 Drawing Sheets

(56) References Cited

U.S. PATENT DOCUMENTS

| | | | | |
|---|---|---|---|---|
| 3,450,277 A | * | 6/1969 | Boppart | B65G 65/22 |
| | | | | 198/317 |
| 3,462,199 A | * | 8/1969 | Downing | B65G 65/38 |
| | | | | 198/493 |
| 3,651,960 A | * | 3/1972 | Buschbom | A01F 25/2009 |
| | | | | 175/383 |
| 4,217,701 A | * | 8/1980 | Mathews | F26B 9/063 |
| | | | | 34/174 |
| 4,245,933 A | | 1/1981 | Wolf | |
| 4,360,294 A | * | 11/1982 | Ahrens | A01F 25/2009 |
| | | | | 406/114 |
| 8,770,388 B1 | | 7/2014 | Chaon et al. | |
| 8,864,433 B2 | | 10/2014 | Hoogestraat et al. | |
| 2017/0190513 A1 | | 7/2017 | Kaeb et al. | |

\* cited by examiner

BIN WALL CLEANER GUIDE ATTACHMENT FOR SWEEP CONVEYOR

CROSS REFERENCES

This application claims the benefit of U.S. Provisional Application No. 62/303,819, filed Mar. 4, 2016.

REFERENCE TO CDS

Not Applicable.

FIELD OF THE INVENTION

The present disclosure relates to conveyors. Particularly, for pivoting sweeps in agricultural bins, and more particularly, to chain-, belt- or auger-based sweep devices used for removing residual seed and grain from a storage bin after the majority of grain or seed has been removed by an underlying conveyor.

BACKGROUND

Seed and grain are commonly stored in grain bins and related storage structures. Rotating sweep conveyors are commonly used to remove seed or grain from the floor of a grain storage bin. Sweep conveyors rotate about a central pivot point. These sweep conveyors sweep residual seed or grain toward a central discharge chute for transferring the seed or grains to a waiting truck, trailer, rail car, etc. Sweep conveyors of this nature are commonly screw auger type, chain driven paddle conveyors, or cleated belt conveyors. Power to the sweep is either transferred from the unload conveyor—as described in U.S. Pat. No. 7,544,031—or the sweep is powered with a dedicated electric motor, or equivalent power source. The sweep conveyor transfers power from the power source, through the auger or chain to turn an idler roller. The idler roller is coupled to a distal drive wheel such that power is transferred from the conveyor to the drive wheel. The driven wheel is mounted perpendicular to the length of the sweep conveyor and drives the sweep about the pivot point, like the hand of a clock.

SUMMARY

We created an apparatus for extending the reach of a sweep conveyor to the interior surface of the bin wall. In grain bins, where the shape is generally round, existing sweeps do not contact the wall and leave a swath of residual grain around the outside the perimeter. This bin wall cleaner directs most of residual grain into the path of the sweep conveyor and results in a more thorough removal of residual grain from within the grain bin.

Our device that has the ability to rotate about the interior of the grain bin with the sweep while engaging an inner surface of the bin wall to direct residual grain into the sweep as the sweep moves forward. The bin wall cleaner extends from the sweep, and is able to extend or retract depending on the shape of the bin wall.

This innovation is also suited for situations where the center well pivot is not in center of the bin. In such circumstances, the sweep may be 3" inches away from the bin wall on one side of the bin and 10" away from the bin wall on the other side of the bin. This leaves a significant amount of residual grain out of the reach of the rotating sweep. This innovation is also suited for situations where the bin is out-of-round. For example, a bin may be 2" out-of-round which translates into a 4" difference in the radius of one side of the bin from another side. As will be discussed below, this innovation is capable of covering the variable distance between the end of the sweep and the bin wall.

The bin wall cleaner is mounted at the distal end of the sweep. At least a first portion of the bin wall cleaner is fixedly mounted to the sweep and at least a second portion of the bin wall cleaner is movable relative to the sweep, so that the bin wall cleaner can extend and retract to maintain contact with the wall. The grain engagement member 102 can be mounted to the leading corner, the trailing corner, or to a portion of the sweep near the distal end such as between the leading and trailing corners.

We also disclose a cleated belt conveyor with detachable cleats. Traditional belt conveyor belts with cleats have cleats that have either been glued or heat welded to the belt. In situations where either the cleats or the belt is damaged, then the entire cleated belt must be replaced. We developed a cleated belt conveyor that allows the cleats to be changed, replaced, or modified without replacing the belt portion. Traditionally, if a user wears out the cleats of a cleated conveyor belt, they must replace the whole belt. With the innovation of this disclosure, it is possible to simply change out the cleat. It is less expensive for the user to purchase replacement cleats to attach them to the user's existing belt without having to purchase the entire cleated belt replacement.

Another advantage is evident in the situation where a user ruins a belt, without causing substantial damage to the cleats. Traditionally, the user would have to replace the belt and cleats since they are glued or heat welded together. With the innovation of this disclosure, it is possible to remove the cleats from the damaged belt and transfer the cleats to a new belt. It is less expensive for the user to purchase a new cleat-less belt, and attach their existing cleats to the new belt without having to purchase the entire cleated belt replacement.

Another advantage of this technology is that the base of the cleat has more durability. In existing cleated belts, the cleat is molded together with a base and it is the base that attached to the belt. In this disclosure, the mount replaces the base. Traditional bases for taller cleats require larger diameter conveyor rollers, because otherwise the base becomes compromised and cracks at the point where the cleat and base are joined. This disclosure replaces that vulnerable portion of the traditional cleat with a more secure mount, thereby allowing a taller cleat to be used in conjunction with a smaller diameter roller.

It is understood that other embodiments will become readily apparent to those skilled in the art from the above detailed description, wherein various embodiments are shown and described by way of illustration only. As will be realized, the concepts are capable of other and different embodiments and their several details are capable of modification in various other respects, all without departing from the spirit and scope of what is claimed as the invention. Accordingly, the drawings and detailed description are to be regarded as illustrative in nature and not as restrictive.

DESCRIPTION OF DRAWINGS

Aspects are illustrated by way of example, and not by way of limitation, in the accompanying drawings, wherein.

DESCRIPTION

As noted above, this Bin wall cleaner for sweep conveyor overcomes numerous problems, such as:
a) residual grain located near the bin wall out of reach of the sweep conveyor, and
b) non-uniform bin wall distance.

Figure 1:
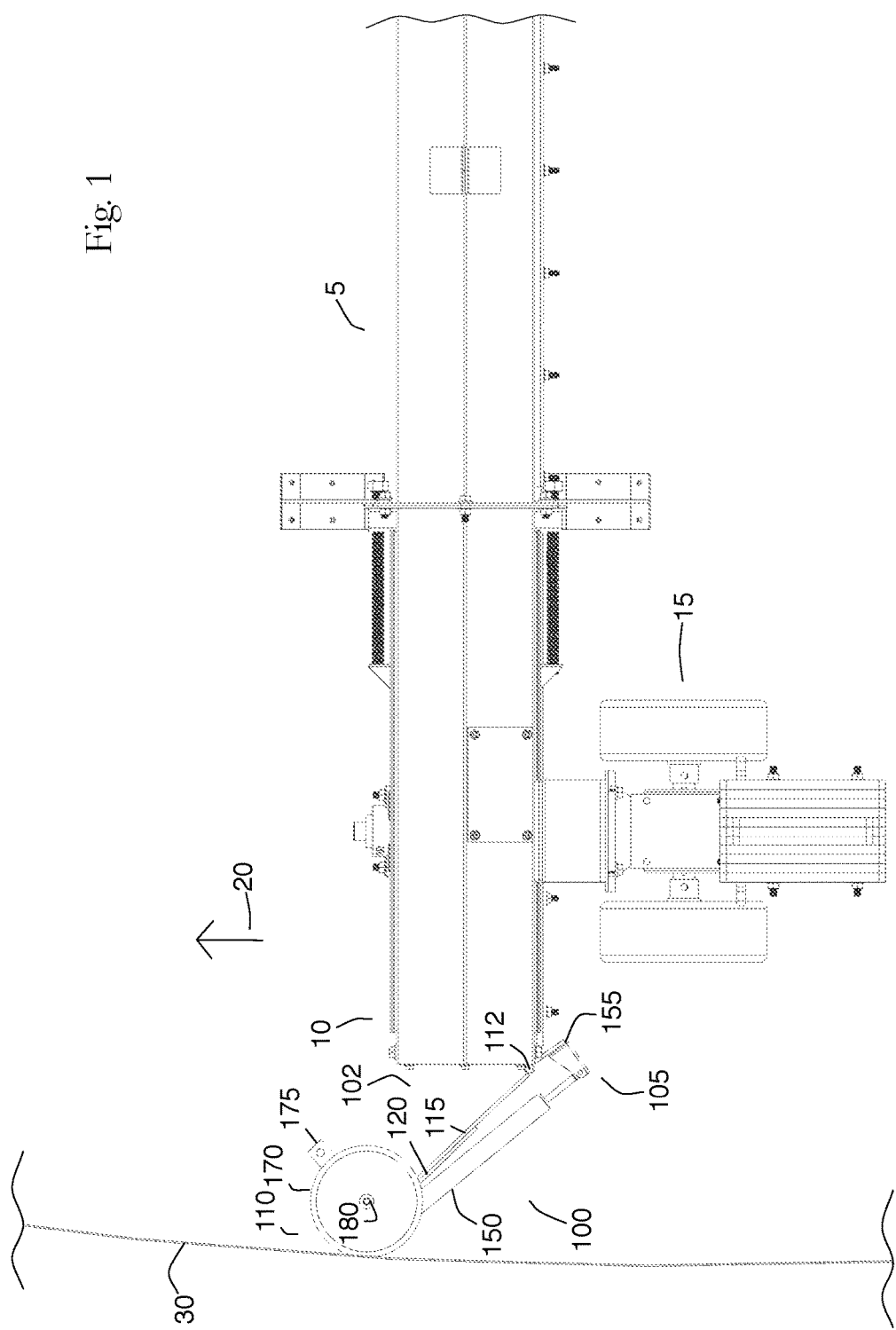
FIG. 1 depicts a top perspective view of the distal end of the sweep conveyor equipped with a Bin wall cleaner with a portion of the bin wall.

As shown in FIG. 1, the bin wall cleaner 100 can be attached to the distal end 10 of a sweep conveyor 5. For this technology, the sweep conveyor can comprise a belt conveyor, chain conveyor, or auger for transporting the grain. The bin wall cleaner 100 has a grain engagement member 102 having at least a first blade portion 115 that directs the seed toward the path of the sweep conveyor 5. The bin wall cleaner 100 has a proximal end 105 and a distal end 110. The proximal end 105 of the bin wall cleaner 100 is mounted to the end of the sweep conveyor 5 using a mounting bracket. As shown in the implement of FIG. 1, the mounting bracket 112 can be a hinge joint.

The grain engagement member 102 of the bin wall cleaner 100 is moveable relative to the sweep. The grain engagement member 102 can be longitudinally extendable, pivotally movable about a vertical axis, or both longitudinally extendable and pivotally movable.

The bin wall cleaner 100 is extendably mounted to the sweep conveyor 5 in order to direct grain that is outside the reach of the sweep conveyor into the sweep conveyor's path. The mounting bracket 112 allows the bin wall cleaner 100 to extend relative to the distal end 10 of the sweep conveyor 5. Alternatively, the bin wall cleaner can be mounted to the distal end 10 of the pivoting sweep conveyor 5 at an angle less than 90° from the distal end of the pivoting sweep conveyor. This angle can be a fixed angle or a variable angle.

Figure 2:
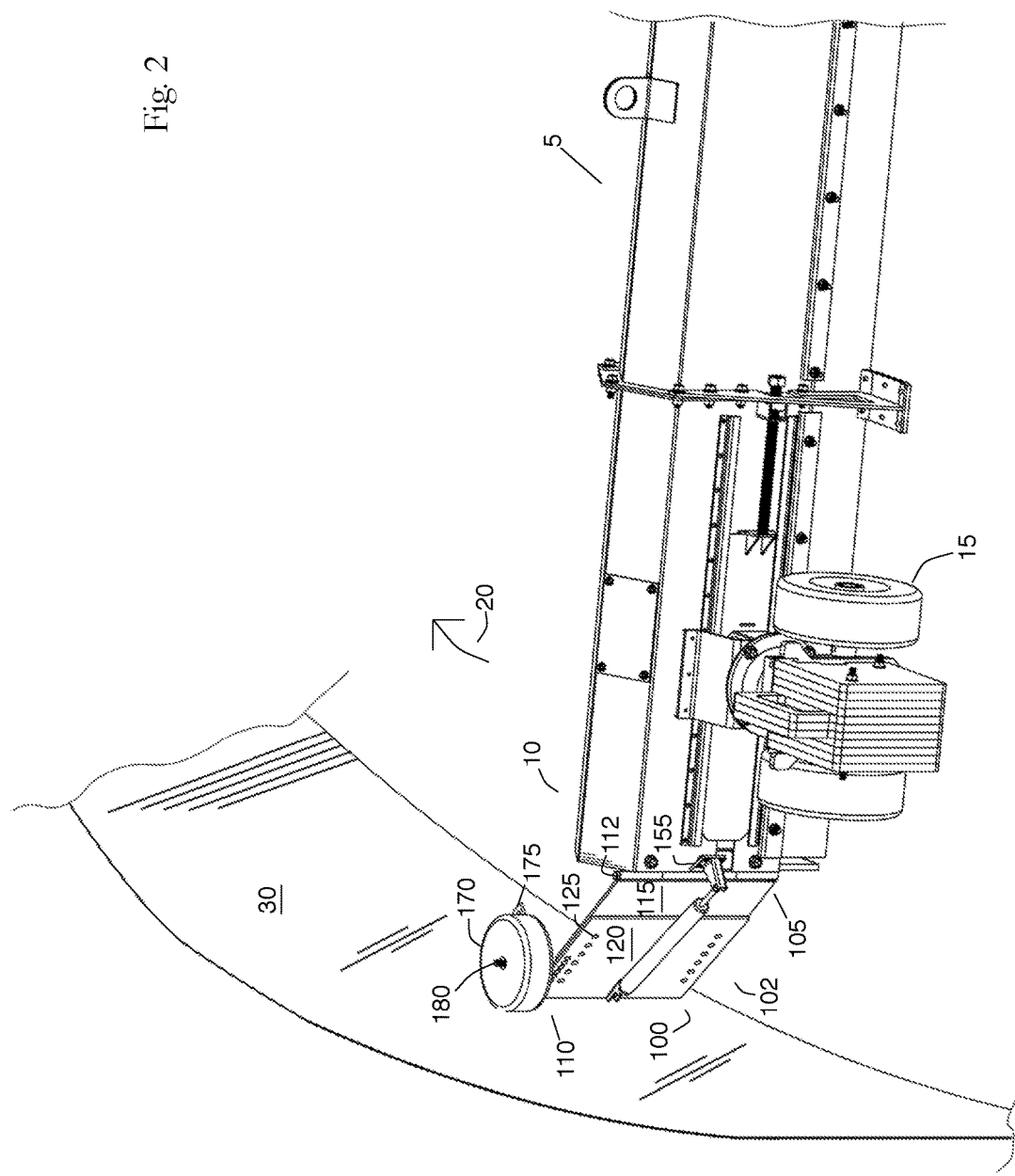
FIG. 2 depicts a top rear perspective view of the distal end of the sweep conveyor equipped with a Bin wall cleaner with a portion of the bin wall.
Figure 3:
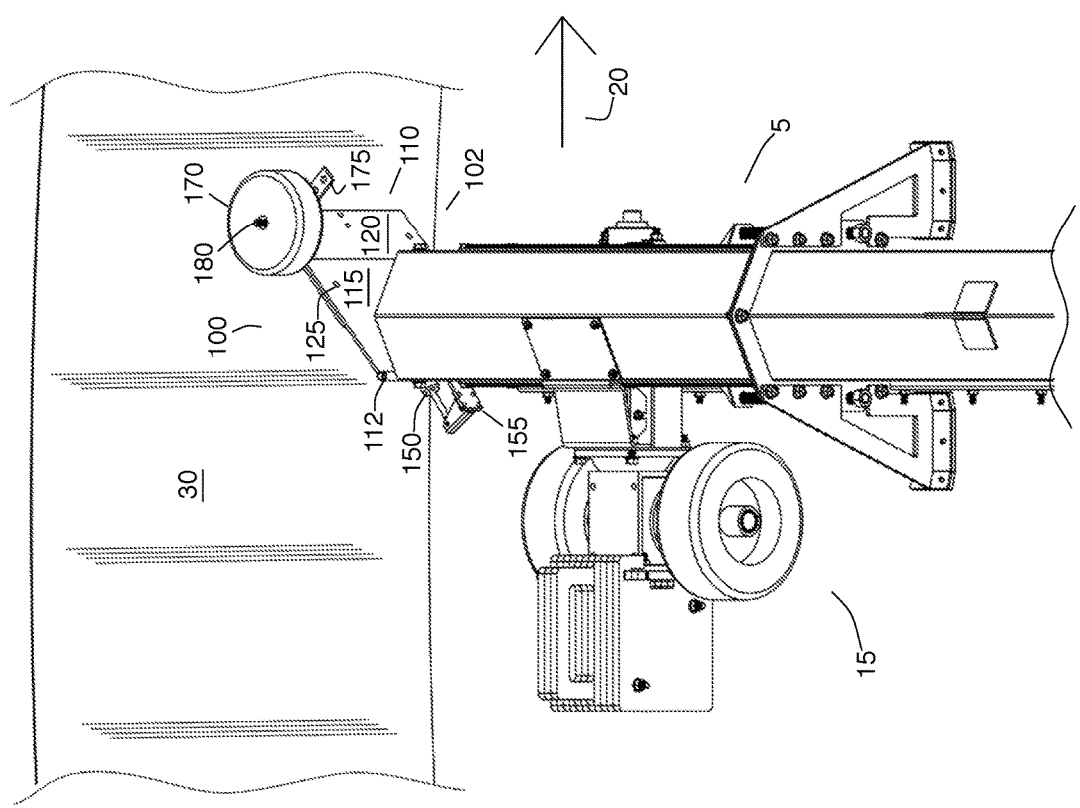
FIG. 3 depicts a top perspective view of the distal end of the sweep conveyor equipped with a Bin wall cleaner with a portion of the bin wall as seen from the center of the bin.

As shown in FIG. 2, the grain engagement member 102 can have multiple blade portions. FIG. 2 shows a grain engagement member 102 having a first blade portion 115 and a second blade portion 120. Each blade has a plurality of adjustment apertures 125. A fastener is received by respective adjustment apertures 125 of the first blade portion 115 and the second blade portion 120 to secure the two blade portions together at a fixed blade length. As such, the length of the grain engagement member 102 is adjustable by changing the selected adjustment apertures 125 to align between the first blade portion 115 and the second blade portion 120.

The grain engagement member 102 extends and retracts from the distal end in order to extend the reach of the sweep conveyor 5 to the bin wall 30. In an embodiment with the bin wall cleaner 100 mounted at a fixed angle, the bin wall cleaner 100 can be extendable by varying the length of the grain engagement member 102, such as by telescoping the blade portions 115, 120. In an embodiment having a telescoping blade assembly, the telescoping blade assembly slides in on itself, allowing the blade portion to be longer or shorter and track with the distance between the distal end 10 of the sweep conveyor 5 and the interior surface of the bin wall 30.

In an embodiment where the bin wall cleaner 100 is mounted to the sweep 5 at a variable angle, the grain engagement member 102 is extendable by increasing or decreasing the angle of the blade portions 115, 120 relative to the sweep. The bin wall cleaner 100 has a proximal end 105 that is extendably mounted to the distal end 10 of the sweep conveyor 5 by a mounting bracket 112. The mounting bracket 112 can be a hinge joint, allowing the bin wall cleaner 100 to pivotally mount to the distal end 10 of the sweep conveyor 5. The grain engagement member 102 has a distal end that extends towards the bin wall 30.

A biasing member 150 maintains the bin wall cleaner 100 in its extended position. As illustrated, the biasing member 150 can comprise an actuator that is mounted to the sweep conveyor 5 and to the grain engagement member 102. The actuator can be a spring, hydraulic, pneumatic, or mechanical actuator. The biasing member 150 maintains the bin wall cleaner 100 in the extended orientation relative to the sweep. In the illustrated embodiment, the biasing member 150 maintains the angle of the grain engagement member 102 as great as possible, until the wall engagement member 170 contacts the bin wall 30 as described below. In this orientation, the grain engagement member 102 extends beyond the sweep towards the bin wall 30 and directs the grain toward the sweep for a more complete removal of residual grain located near the bin wall. As shown in FIG. 2, the biasing member can be mounted to its own biasing member bracket 155. Alternatively, the biasing member 150 is attached directly to the distal end of the sweep conveyor.

The Bin wall cleaner 100 can comprise a wall engagement member 170. The wall engagement member 170 contacts the inner surface of the bin wall 30. By directly contacting the inner surface of the bin wall 30, the bin wall cleaner is able to minimize the gap between grain engagement member 102 and the inner surface of the bin wall as the sweep rotates within the bin. The wall engagement member 170 is illustrated as a wheel mounted to the distal end of the grain engagement member 102. Alternatively, the wall engagement member 170 can be a shoe, such as an ultra-high-molecular-weight polyethylene plate that engages the inner surface of the bin wall.

In order to control the pivoting or extending motion, for example, the biasing member 150 is attached at one end to the sweep—or a mount securely connected to the sweep. In the illustrated embodiment, one end of the actuator is mounted to the biasing member bracket 155 and the other end of the actuator is attached to the grain engagement member 102. The contracting force of the actuator maintains the wall engagement member 170 in contact with the bin wall 30. As the actuator extends or retracts the actuator rod, the grain engagement member 102 moves relative to the sweep. In an alternative embodiment, the biasing member 150 extends to maintain the grain engagement member 102 pivoted toward the bin wall and has appropriate linkages between the sweep 5 and the grain engagement member 102 to maintain the wall engagement member 170 in contact with the bin wall 30.

The Bin wall cleaner uses one or more blade portions to engage residual grain that would otherwise remain out of the reach of the sweep conveyor. The blade portions 115, 120 can be flat or curved. The blade portions 115, 120 can be made of a solid material, such as a metal or plastic plate. An example of an appropriate plastic plate is an ultra-high-molecular-weight polyethylene, which would provide a low friction and high durability point of contact. The grain engagement member 102 is pivotally mounted to a distal end of the sweep.

The Bin wall cleaner 100 is extendably mounted to the sweep conveyor so that the bin wall cleaner is able to cover the variable distance between the distal end of the sweep and the bin wall. For example, if the bin is out-of-round 4", then the bin wall cleaner could extend for the portion of the bin with the longer radius and retract for the portion of the bin with the shorter radius. The height of the bin wall cleaner can correspond to the height of the sweep.

The Bin wall cleaner 100 is mounted to the distal end 10 of the sweep conveyor 5 at an angle to encourage the residual grain into the path of the sweep conveyor. The angle of the grain engagement member 102 of the bin wall cleaner relative to the sweep is preferably less than 90°. In this configuration, the grain engagement member 102 moves with the sweep to push grain into the path of the sweep. This results in a more thorough removal of residual grain from within the grain bin. In the variable angle embodiment, the length of the grain engagement member 102 of the bin wall cleaner 100 is determined by the maximum distance required to be covered by the bin wall cleaner between the sweep 5 and the bin wall 30.

A wall engagement member 170 can be mounted to the distal end of the Bin wall cleaner 100. In the embodiment shown in FIG. 2, the wall engagement member 170 is a wheel, such as a rubber tire. As the sweep conveyor 5 pivots about the cylindrical bin, the wall engagement member 170 rotates about its central vertical axis and resists the biasing force exerted by the biasing member 150.

The wall engagement member 170 maintains contact with the bin wall 30 to assure that the blade portions 115, 120 extend close to the bin wall 30 if the bin is out-of-circle and has a variable radius. The wheel has a radius and is mounted about a vertical axis. As shown in FIG. 2, the wall engagement member 170 is mounted to the Bin wall cleaner 100 at a distance from the distal end 110 of the Bin wall cleaner 100 of about one-half of the radius of the wall engagement member 170. The distal end 110 of the grain engagement member 102 is configured to extend toward the interior surface of the bin wall 30 when the wall engagement member 170 engages the interior surface of the bin wall 30. As such, there is a minimal gap between the distal end 110 of the blade portions 115, 120 and the bin wall 30.

The sweep conveyor may be a standard, existing sweep conveyor or a modified sweep conveyor with an open distal conveyor end. For a bin wall cleaner 100 for use with a standard conveyor, the respective mounts and brackets may be configured to attach to the leading edge of the distal end 110 of the sweep conveyor 5. In such an embodiment, the blade portions 115, 120 may extend outwardly ahead of the sweep conveyor 5. As such, the grain engagement member 102 directs the seed into the opening in the leading wall of the sweep conveyor 5.

Figure 4:
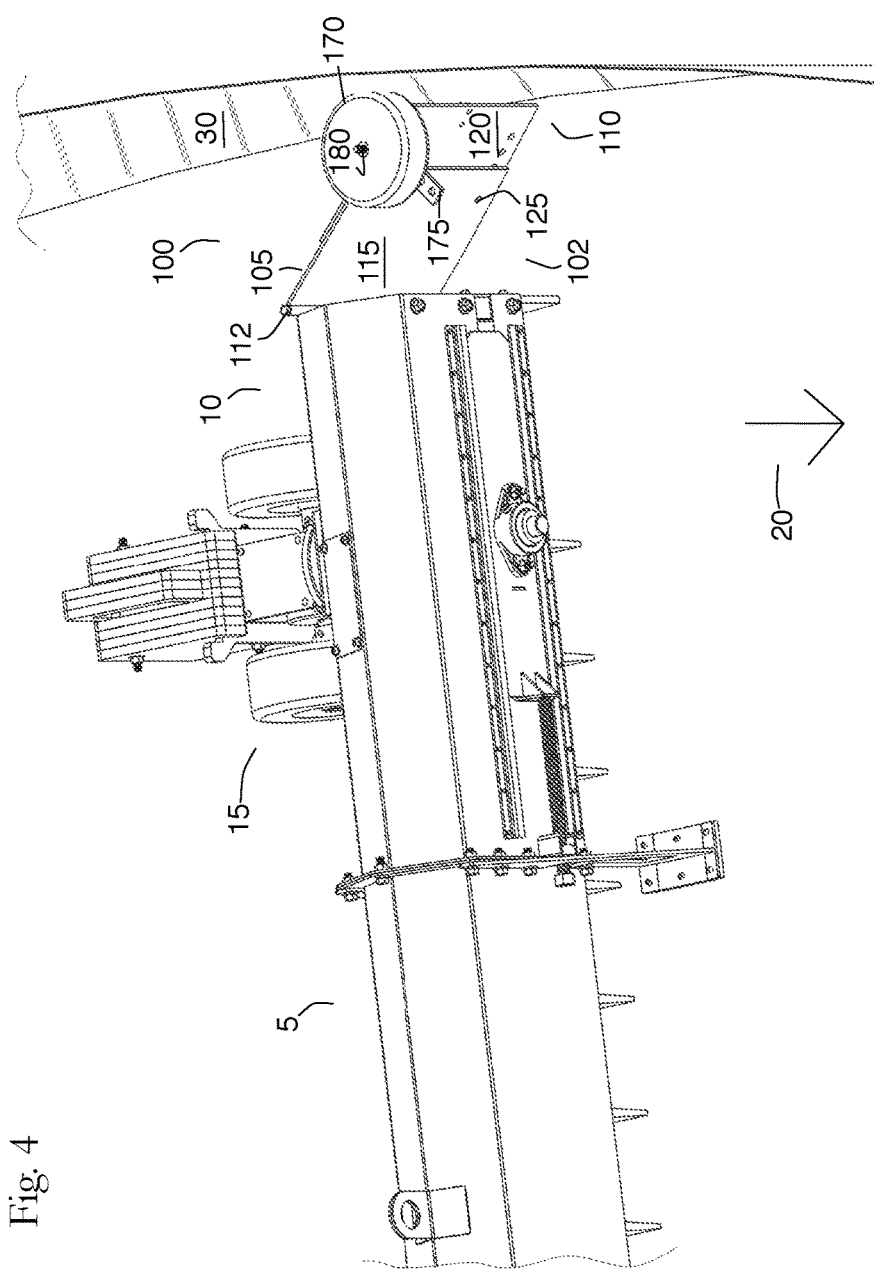
FIG. 4 depicts a top front perspective view of the distal end of the sweep conveyor equipped with a Bin wall cleaner with a portion of the bin wall.

The distal longitudinal end 10 of the sweep conveyor 5 can be open such that grain may enter through the open distal conveyor end. In this embodiment, the respective mounts and brackets are configured to attach the Bin wall cleaner 100 to the trailing end of the distal longitudinal end 10 of the sweep conveyor 5, as shown in FIG. 4.

The grain engagement member 102 of the bin wall cleaner 100 can also comprise a fixed or rotating brush (not shown). The brush can extend downwardly from the blades 115, 120. Alternatively, the brush can extend outwardly from the blades 115, 120. Alternatively, the brush could extend downwardly and outwardly. The brush extends the reach of the grain engagement member 102 and facilitates removal of the residual grain from the bin. A rotating brush could be powered by the motion of the sweep, by a linkage to the auger, a linkage to the conveyor roller, a linkage to the wall engagement member 170, or could have an independent power source.

The bin wall cleaner can be integrated with the sweep, or provided as a modular attachment. As a modular attachment, the bin wall cleaner can be directly mounted to the sweep. Alternatively, a bracket can be used to mount the bin wall cleaner to the distal end of generic sweeps. Alternatively, the bin wall cleaner can be integrally formed with the sweep conveyor. As used herein, the sweep conveyor can comprise a belt conveyor, a chain conveyor or an auger mechanism.

In conveyors utilizing a continuous belt conveyor, the belt can utilize a bracket to secure a plurality of spaced-apart cleats to the outer surface of the belt. The bracket is secured to the cleats using one or more fasteners. The fastener can be a plurality of bolts that pass through the bracket and the cleat and are secured by each bolt being securely received by a respective nut. Alternatively, the fasteners could comprise rivets, screws, or pins. Alternatively, a receiver can be integrated into the cleats, where the receiver is configured to allow the bracket to be mounted to the cleat. Alternatively, the bracket can be glued or heat-welded to the cleat. The bracket is secured to the belt using one or more fasteners. As depicted in the images, the fasters can be a plurality of bolts that pass through the bracket and the belt and are secured by each bolt being securely received by a respective nut. Alternatively, the fasteners could comprise rivets, screws, or pins. Alternatively, a receiver can be integrated into the belt that is configured to allow the bracket to be mounted to the belt. Alternatively, the bracket can be glued or heat-welded to the belt. This conveyor belt with detachable cleats can be used in a sweep conveyor, incline conveyor, tube conveyor, or other conveyor applications.

The invention claimed is:

1. A bin wall cleaner attachment for directing residual grain from the periphery of a grain bin into a path of a pivoting sweep conveyor, the pivoting sweep conveyor having a longitudinal axis and a distal end, the distal end distal to a central pivot point, the bin wall cleaner comprising:
   a) A grain engagement member configured to be mounted to the distal end of a pivoting sweep conveyor, the grain engagement member further comprising:
      i) A first blade portion;
      ii) A second blade portion partially overlapping the first blade portion and partially extending from the first blade portion toward the periphery of the grain bin;
      iii) Wherein the first blade portion and the second blade portion are configured to maintain a substantially vertical orientation to cooperatively direct residual grain into the path of the pivoting sweep conveyor;
   b) A wall engagement member attached to the grain engagement member;
   c) A biasing member configured to extend the second blade portion of the grain engagement member away from the distal end of the pivoting sweep conveyor until the wall engagement member is maintained in contact with an interior surface of the bin wall;
   d) wherein the distal end of the grain engagement member is configured to extend toward the interior surface of the bin wall with the wall engagement member touching the interior surface of the bin wall; and
   e) wherein the second blade portion is configured to slide upon the first blade portion to extend and retract the second blade portion.

2. The bin wall cleaner attachment of claim 1, wherein the wall engagement member is a wheel rotatably mounted to the grain engagement member, wherein the wheel rotates about a vertical axis.

3. The bin wall cleaner attachment of claim 1, wherein the grain engagement member is configured to pivot about a vertical hinge to extend and retract from the pivoting sweep conveyor.

4. The bin wall cleaner attachment of claim 1, wherein the first blade portion is pivotally mounted to the pivoting sweep conveyor at an angle less than 90° from an axis perpendicular to the longitudinal axis of the pivoting sweep conveyor.

5. The bin wall cleaner attachment of claim 4, wherein the first blade portion and second blade portion extend in a substantially vertical plane.

6. The bin wall cleaner attachment of claim 4, wherein the first blade portion and the second blade portion have a substantially vertical surface that is curved.

\* \* \* \* \*